US010056075B2

(12) United States Patent
Horesh et al.

(10) Patent No.: US 10,056,075 B2
(45) Date of Patent: *Aug. 21, 2018

(54) SYSTEMS AND METHODS FOR ACCELERATING HESSIAN-FREE OPTIMIZATION FOR DEEP NEURAL NETWORKS BY IMPLICIT PRECONDITIONING AND SAMPLING

(71) Applicant: International Business Machines Corporation, Armonk, NY (US)

(72) Inventors: Lior Horesh, North Salem, NY (US); Brian E. D. Kingsbury, Cortlandt Manor, NY (US); Tara N. Sainath, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,775

(22) Filed: Dec. 9, 2016

(65) Prior Publication Data

US 2017/0092263 A1    Mar. 30, 2017

Related U.S. Application Data

(63) Continuation of application No. 14/500,457, filed on Sep. 29, 2014, now Pat. No. 9,601,109.

(60) Provisional application No. 61/912,622, filed on Dec. 6, 2013.

(51) Int. Cl.
*G10L 15/06* (2013.01)
*G10L 15/16* (2006.01)
*G10L 15/02* (2006.01)

(52) U.S. Cl.
CPC .......... *G10L 15/063* (2013.01); *G10L 15/02* (2013.01); *G10L 15/16* (2013.01)

(58) Field of Classification Search
CPC ....................................... G10L 15/063
USPC ........................................... 704/232
See application file for complete search history.

(56) References Cited

U.S. PATENT DOCUMENTS 9,601,109 B2 * 3/2017 Horesh ................. G10L 15/063

OTHER PUBLICATIONS

James Martens, "Deep Learning via Hessian-Free Optimization," 27th International Conference on Machine Learning (ICML), Jun. 2010, 8 pages, vol. 10, Haifa, Israel.
L. Horesh et al., "Large-Scale Non-Linear 3D Reconstruction Algorithms for Electrical Impedance Tomography of the Human Head," World Congress on Medical Physics and Biomedical Engineering, Aug.-Sep. 2006, pp. 3862-3865, vol. 14, Seoul, South Korea.
J. Dean et al., "Large Scale Distributed Deep Networks," Advances in Neural Information Processing Systems (NIPS), Dec. 2012, pp. 1223-1231, vol. 25.

(Continued)

*Primary Examiner* — Susan McFadden
(74) *Attorney, Agent, or Firm* — David M. Quinn; Ryan, Mason & Lewis, LLP

(57) ABSTRACT

A method for training a deep neural network, comprises receiving and formatting speech data for the training, preconditioning a system of equations to be used for analyzing the speech data in connection with the training by using a non-fixed point quasi-Newton preconditioning scheme, and employing flexible Krylov subspace solvers in response to variations in the preconditioning scheme for different iterations of the training.

16 Claims, 10 Drawing Sheets

(56) References Cited

OTHER PUBLICATIONS

O. Vinyals et al., "Krylov Subspace Descent for Deep Learning," International Conference on Artificial Intelligence and Statistics (AISTATS), Apr. 2012, pp. 1261-1268, Canary Islands, Spain.

H. Su et al., "Error Back Propagation for Sequence Training of Context-Dependent Deep Networks for Conversational Speech Transcription," IEEE International Conference on Acoustics, Speech and Signal Processing (ICASSP), May 2013, pp. 6664-6668, Vancouver, British Columbia, Canada.

Jorge Nocedal, "Updating Quasi-Newton Matrices with Limited Storage," Mathematics of Computation, Jul. 1980, pp. 773-782, vol. 35, No. 151.

J.L. Morales et al., "Automatic Preconditioning by Limited Memory Quasi-Newton Updating," Society for Industrial and Applied Mathematics (SIAM), Journal on Optimization, Sep. 1999, pp. 1079-1096, vol. 10, No. 4.

Yvan Notay, "Flexible Conjugate Gradients," Society for Industrial and Applied Mathematics (SIAM), Journal on Scientific Computing, Jun. 2000, pp. 1444-1460, vol. 22, No. 4.

R.H. Byrd et al., "Sample Size Selection in Optimization Methods for Machine Learning," Mathematical Programming, Series B, Aug. 2012, pp. 127-155, vol. 134, No. 1.

M.P. Friedlander et al., "Hybrid Deterministic-Stochastic Methods for Data Fitting," Society for Industrial and Applied Mathematics (SIAM), Journal on Scientific Computing, 2012, pp. 1380-1405, vol. 34, No. 3.

Barak A. Pearlmutter, "Fast Exact Multiplication by the Hessian," Neural Computation, Jan. 1994, pp. 147-160, vol. 6, No. 1.

Nicol N. Schraudolph, "Fast Curvature Matrix-Vector Products for Second-Order Gradient Descent," Neural Computation, Jul. 2002, pp. 1723-1738, vol. 14, No. 7.

O. Chapelle et al., "Improved Preconditioner for Hessian Free Optimization," Advances in Neural Information Processing Systems (NIPS), Workshop on Deep Learning and Unsupervised Feature Learning, 2011, 8 pages.

Jonathan Richard Shewchuk, "An Introduction to the Conjugate Gradient Method Without the Agonizing Pain," School of Computer Science, Aug. 1994, Edition 1-1/4, 64 pages.

A. Aravkin et al., "Robust Inversion, Dimensionality Reduction, and Randomized Sampling," Mathematical Programming: Series A and B—Special Issue on ISMP, Aug. 2012, pp. 101-125, vol. 134, No. 1.

H. Soltau et al., "The IBM Attila Speech Recognition Toolkit," IEEE Spoken Language Technology Workshop (SLT), Dec. 2010, pp. 97-102.

B. Kingsbury et al., "Scalable Minimum Bayes Risk Training of Deep Neural Network Acoustic Models Using Distributed Hessian-Free Optimization," 13th Annual Conference of the International Speech Communication Association (Interspeech), Sep. 2012, 4 pages.

"Using Neural Nets to Recognize Handwritten Digits," Neural Networks and Deep Learning, http://neuralnetworksanddeeplearning.com/chap1.html, Chapter 1, Sep. 2014, 55 pages.

Wikipedia, "Hessian Matrix," http://en.wikipedia.org/wiki/Hessian_matrix, Sep. 2014, 9 pages.

Wikipedia, "Deep Learning," http://en.wikipedia.org/wiki/Deep_learning, Sep. 2014, 6 pages.

B. Kingsbury, "Lattice-Based Optimization of Sequence Classification Criteria for Neural-Network Acoustic Modeling," IEEE International Conference on Acoustics, Speech and Signal Processing (ICASSP), Apr. 2009, pp. 3761-3764, Taipei, Taiwan.

List of IBM Patents or Patent Applications Treated as Related.

\* cited by examiner

Algorithm 1 Hessian-free optimization (after [1]).

initialize $\theta$; $d_0 \leftarrow 0$; $\lambda \leftarrow \lambda_0$; $\mathcal{L}_{prev} \leftarrow \mathcal{L}(\theta)$
while not converged do
    $g \leftarrow \nabla \mathcal{L}(\theta)$
    Let $q_\theta(d) = \nabla \mathcal{L}(\theta)^T d + \frac{1}{2} d^T (G(\theta) + \lambda I) d$
    $\{d_1, d_2, ..., d_N\} \leftarrow \text{CG-MINIMIZE}(q_\theta(d), d_0)$
    $\mathcal{L}_{best} \leftarrow \mathcal{L}(\theta + d_N)$
    for $i \leftarrow N-1, N-2, ..., 1$ do     ▷ *line search*
        $\mathcal{L}_{curr} \leftarrow \mathcal{L}(\theta + d_i)$
        if $\mathcal{L}_{prev} \geq \mathcal{L}_{best} \land \mathcal{L}_{curr} \geq \mathcal{L}_{best}$ then
            $i \leftarrow i + 1$
            break
        $\mathcal{L}_{best} \leftarrow \mathcal{L}_{curr}$
    if $\mathcal{L}_{prev} < \mathcal{L}_{best}$ then
        $\lambda \leftarrow \frac{3}{2}\lambda$; $d_0 \leftarrow 0$
        continue
    $\rho = (\mathcal{L}_{prev} - \mathcal{L}_{best}) / q_\theta(d_N)$
    if $\rho < 0.25$ then
        $\lambda \leftarrow \frac{2}{3}\lambda$
    else if $\rho > 0.75$ then
        $\lambda \leftarrow \frac{3}{2}\lambda$
    $\theta \leftarrow \theta + \alpha d_i$; $d_0 \leftarrow \beta d_N$; $\mathcal{L}_{prev} \leftarrow \mathcal{L}_{best}$

Algorithm 2 L-BFGS Algorithm

Position at iteration $k$: $x_k$
$g_k = \Delta f(x_k)$, where $f$ is the function to be minimized
$s_k = x_{k+1} - x_k$
$y_k = g_{k+1} - g_k$
$\rho_k = \dfrac{1}{y_k^T s_k}$
Initial Hessian: $H_k^0 = \dfrac{y_k^T s_k}{y_k^T y_k} I$
$q = g_k$
for $i \leftarrow k - 1, k - 2, \ldots, k - m$ do
  $\alpha_i = \rho_i s_i^T q$
  $q = q - \alpha_i y_i$
$z = H_k^0 q$
for $i \leftarrow k - m, k - m + 1, \ldots, k - 1$ do
  $\beta_i = \rho_i y_i^T z$
  $z = z + s_i(\alpha_i - \beta_i)$
$H_k g_k = z$                    ▷ search direction

400

500

600

700

800

900

SYSTEMS AND METHODS FOR ACCELERATING HESSIAN-FREE OPTIMIZATION FOR DEEP NEURAL NETWORKS BY IMPLICIT PRECONDITIONING AND SAMPLING

TECHNICAL FIELD

The field generally relates to systems and methods for training a deep neural network and, in particular, systems and methods for accelerating Hessian-free optimization of deep neural networks using implicit preconditioning and sampling.

BACKGROUND

Second order non-linear optimization techniques have been extensively explored for problems involving pathological curvature, such as deep neural network (DNN) training problems. A second order technique, known as Hessian-free (HF) optimization, has been demonstrated in connection with DNNs on various image recognition tasks. In addition, an HF optimization technique was applied with DNNs for speech recognition tasks. Alternatively, super linear methods, including quasi-Newton methods (e.g., Limited Memory Broyden-Fletcher-Goldfarb-Shanno (L-BFGS), Davidson-Fletcher-Powell (DFP), Symmetric Rank 1 (SR1)) have been used in connection with DNN training.

Second order methods for sequence-training of DNNs can provide, for example, a 10-20% relative improvement in word error rate (WER) over a cross-entropy (CE) trained DNN. Because sequence training uses information from time-sequential lattices corresponding to utterances, sequence training is performed using utterance randomization rather than frame randomization. For mini-batch stochastic gradient descent (SGD), which is often used for CE training, frame randomization in some cases, has been shown to perform better than utterance randomization. However, because sequence-training is accomplished at the utterance level, second order and super linear methods typically perform better than SGD, as these methods compute a gradient over a large batch of utterances compared to utterance mini-batch SGD.

HF optimization techniques for sequence training can be slow, requiring, for example, about 3 weeks for training a 300-hour Switchboard task using 64 parallel machines. There are at least two reasons why training is slow. Firstly, a great number of Krylov subspace iterations may be required for a solution to approximate the Hessian within each HF iteration (i.e., solution of the normal system of equations). Secondly, a fixed amount of data for all HF iterations in both the gradient and Krylov subspace iteration computations is used.

Accordingly, there is a need for algorithmic strategies for reduction of the amount of time spent in both gradient and Krylov subspace computations.

SUMMARY OF THE INVENTION

In general, exemplary embodiments of the invention include systems and methods for training a deep neural network and, in particular, systems and methods for accelerating Hessian-free optimization of deep neural networks using implicit preconditioning and sampling.

According to an exemplary embodiment of the present invention, a method for training a deep neural network, comprises receiving and formatting speech data for the training, preconditioning a system of equations to be used for analyzing the speech data in connection with the training by using a non-fixed point quasi-Newton preconditioning scheme, and employing flexible Krylov subspace solvers in response to variations in the preconditioning scheme for different iterations of the training.

According to an exemplary embodiment of the present invention, a system for training a deep neural network, comprises a memory and at least one processor coupled to the memory, an input component, executed via the at least one processor, which receives and formats speech data, a preconditioning component, executed via the at least one processor and operatively coupled to the input component, which preconditions a system of equations to be used for analyzing the speech data in connection with the training by using a non-fixed point quasi-Newton preconditioning scheme, and a solution component, executed via the at least one processor and operatively coupled to the preconditioning component, which employs flexible Krylov subspace solvers in response to variations in the preconditioning scheme for different iterations of the training.

According to an exemplary embodiment of the present invention, a computer program product for training a deep neural network, comprises a computer readable storage medium having program instructions embodied therewith, the program instructions executable by a processor to cause the processor to perform a method comprising receiving and formatting speech data for the training, preconditioning a system of equations to be used for analyzing the speech data in connection with the training by using a non-fixed point quasi-Newton preconditioning scheme, and employing flexible Krylov subspace solvers in response to variations in the preconditioning scheme for different iterations of the training.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 1 illustrates an implementation of HF optimization as pseudo-code in Algorithm 1, according to an exemplary embodiment of the invention.

FIG. 3 outlines an L-BFGS algorithm in Algorithm 2, according to an exemplary embodiment of the invention.

DETAILED DESCRIPTION OF EXEMPLARY EMBODIMENTS

Figure 2:
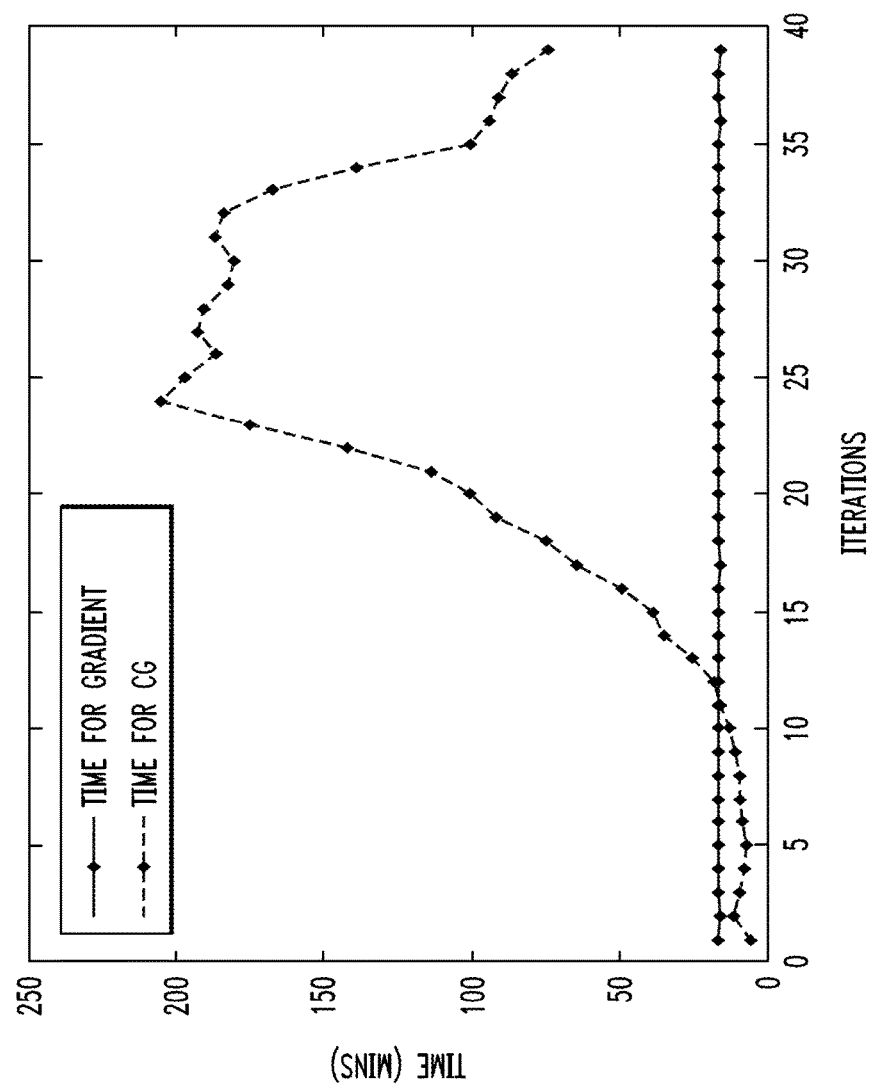
FIG. 2 is a graph of time (minutes) versus number of iterations, indicating that as HF training iterations increase, training time per iteration is dominated by Krylov subspace linear solver (CG in this case) iterations.

Exemplary embodiments of the invention will now be discussed in further detail with regard to systems and methods for training a deep neural network and, in particular, systems and methods for accelerating Hessian-free optimization of deep neural networks using implicit preconditioning and sampling. This invention may, however, be embodied in many different forms and should not be construed as limited to the embodiments set forth herein.

Embodiments of the present invention provide systems and methods for speeding up HF training, by decreasing the amount of data used for training, and reducing the number of Krylov subspace solver iterations used for implicit estimation of the Hessian. An embodiment of the present invention utilizes a quasi-Newton (such as, for example, an L-BFGS algorithm) preconditioning scheme, that avoids the need to explicitly access the Hessian. In addition, an embodiment of the present invention employs flexible Krylov subspace solvers in response to the non-fixed point quasi-Newton (such as, L-BFGS) preconditioning scheme, which is not a fixed-point iteration. An embodiment of the present invention also uses a sampling algorithm, which geometrically increases the amount of data utilized for gradient and Krylov subspace iteration calculations.

In experimental examples on a 50-hr English Broadcast News task, the embodiments of the present invention provided approximately a 1.5× increase in the speed of HF training, whereas, in experimental examples on a 300-hr Switchboard task, the embodiments of the present invention provided over a 2.3× increase in the speed of HF training, with no increase in WER. The results suggest that further increases in the speed of HF training are expected, as problem scale and complexity grows.

As used herein, "deep neural network (DNN)" can refer to an artificial neural network having multiple hidden layers of nodes between the input and output layers. Each hidden layer computes a non-linear transformation of a previous layer. Some layers comprise an affine transformation, parameterized by a weight matrix and bias vector, followed by a nonlinearity which may be either pointwise (e.g., a pointwise logistic nonlinearity or pointwise rectified linear nonlinearity) or vector-valued (e.g., a softmax nonlinearity). Other layers may implement fixed operations such as contrast normalization or summarization and downsampling of inputs (called "pooling" in the neural network literature).

As used herein, "second order optimization" can refer to a class of optimization techniques for which the asymptotic rate of residual convergence is quadratic (i.e., of second order). A Newton optimization method is an example of second order optimization. Second order methods typically converge much faster to a local minimum than their superlinear, and linear (first order) counterparts. A first order optimization method may include, for example, steepest descent; a super linear method may include, for example, a quasi-Newton method.

As used herein, "sequence training" can refer to analyzing voice inputs and using the voice inputs to fine-tune the recognition of speech by using information from time-sequential lattices corresponding to utterances. Sequence training is performed using utterance randomization.

As used herein, "cross-entropy (CE) training" can refer to a process in which the parameters of a deep neural network are adjusted to minimize the cross-entropy between a reference labeling of a training data set and the output of the neural network.

As used herein, "Hessian" or "Hessian matrix" is a matrix of second-order partial derivatives of a function, which is used in non-linear optimization problems.

As used herein, "Hessian-Free (HF) training" can refer to a second order method of optimization that does not require explicit formation of the Hessian (and, therefore, called "Hessian-Free"). The underlying idea is to compute the action of the Hessian upon a vector (as required by some iterative solvers, such as Krylov subspace solvers), rather than the Hessian itself. HF methods enable the incorporation of curvature information, while avoiding the computationally intensive explicit construction of the Hessian or its inverse.

As used herein, "preconditioning" can refer to, for example, in the context of linear algebra, the process of transforming a system of equations into one that can be solved more readily.

As used herein, "Krylov subspace solvers" can refer to a family of linear system solvers typically used for large-scale systems of equations. The construction of the subspace is based upon the notion of conjugated search directions (e.g., orthogonal with respect to a matrix under consideration). This class of solvers permits access to a matrix in the form of matrix-vector products, which enables HF operations. The level of exactness of a solution can be determined by increasing the subspace (e.g., by performing more iterations) or by preconditioning, using, for example, quasi Newton methods. At each Krylov subspace solver iteration, the subspace is extended to include one or more additional vectors.

As used herein, "flexible Krylov subspace solvers" can refer to a sub-class of linear solvers that result in convergence even if a preconditioner is not a fixed-point preconditioner. This is in contrast to Krylov subspace methods that may break or stagnate when a preconditioner is not fixed-point.

As used herein, "Limited Memory Broyden-Fletcher-Goldfarb-Shanno (L-BFGS)" can refer to a non-linear optimization method that belongs to the quasi Newton family. This method implicitly constructs an approximation of the Hessian (or its inverse), and, thereby, can offer a super-linear convergence rate. The method is typically used to solve non-linear optimization problems directly, such as, a training problem.

As used herein "quasi-Newton based preconditioning" can refer to using a quasi-Newton optimization method (such as L-BFGS method) as a preconditioner for solution of a normal system of linear equations. The normal system of equations in an HF optimization can be solved using a Krylov subspace solver. That normal system of equations can be pre-conditioned using a quasi-Newton algorithm, and to prevent breakdown of the iterative solver, flexible Krylov subspace solvers can be used. Embodiments of the present invention are not limited to an L-BFGS preconditioner, and other quasi-Newton method preconditioners, such as, for example, Davidon-Fletcher-Powell (DFP) and Symmetric rank one correction (SR1), may be used.

As used herein "conjugated gradient (CG) or "preconditioned conjugated gradient (PCG)" can refer to an example of a type of Krylov subspace solver, the latter being a preconditioned version of the CG algorithm. It is to be understood that PCG may be substituted for CG in portions of this specification where preconditioned versions of the CG algorithm can be and/or are used. Embodiments of the present invention are not limited to CG or PCG Krylov subspace solvers, and other Krylov subspace solvers, such as, for example, generalized minimal residual method (GMRES), minimal residual method (MINRES), biconjugate gradient stabilized method (BICGSTAB) and quasi minimal residual (QMR) solvers, may be used.

Embodiments of the present invention are discussed in connection with CG and PCG solvers used to estimate the Hessian. However, the proposed algorithms for reducing training time, in accordance with the embodiments of the present invention, are not limited to use in connection with CG and PCG solvers, can be used with any other flexible Krylov subspace solver variant.

Embodiments of the present invention provide a preconditioner to reduce CG iterations, thereby reducing the computational burden of a consequent solution phase. Embodiments of the present invention further identify a proper balance between computational efforts invested in preconditioning, and computational efforts invested in the consequent solution phase.

In accordance with an embodiment of the present invention, the Hessian is not explicitly constructed. Quasi-Newton approaches construct an approximation (e.g. a low rank approximation) to the Hessian, and in their limited memory versions, only form such approximations implicitly. Embodiments of the present invention use the quasi-Newton L-BFGS method as a preconditioner to a CG solver. While both quasi-Newton approaches and CG exploit an underlying structure of the linear(ized) system, the postulated structural assumptions of a low rank approximation and CG are complementary. Therefore, a combination of a quasi-Newton method as a preconditioner to a CG solver is more effective than dependence upon each one solely. The quasi-Newton method, for example, L-BFGS, is not used directly for HF optimization of DNNs because the quasi-Newton method, for example, L-BFGS, crudely approximates a curvature matrix, whereas the HF method makes implicitly available the exact curvature matrix, which allows for the identification of directions with extremely low curvature.

The use of L-BFGS for preconditioning may be applicable to numerical simulations. Embodiments of the present invention demonstrate that a quasi-Newton method, for example, L-BFGS, serves as an effective preconditioner for CG-based HF training of DNNs on large-scale speech recognition data. In addition, embodiments of the present invention do not employ a fixed Krylov subspace solver approach. Non-fixed point preconditioners, such as L-BFGS, are not stably used with fixed Krylov subspace solver iterative schemes. In order to ensure stable and predictable convergence, embodiments of the present invention use flexible variants of Krylov subspace solver methods, which avoid failures and breakdowns to which fixed Krylov subspace solvers may be susceptible.

Embodiments of the present invention also introduce a sampling strategy in which the amount of data used for gradient-based (e.g., gradient and CG) calculations, is gradually increased. In optimization problems, gradient-based methods typically operate within two regimes. For example, stochastic approximation methods, such as stochastic gradient descent, select a small sample size to estimate the gradient. These methods often decrease the objective function loss relatively quickly during initial training iterations, and, during later iterations, the movement of the objective function is relatively slow. With respect to the other regime, sample approximation techniques compute the gradient on a large sample of data. While this computation can be expensive, the gradient estimates are more reliable than stochastic approximation methods, and the objective function progresses relatively well during later training iterations. Embodiments of the present invention use a hybrid method that captures the benefits of both stochastic and sample approximation methods, by increasing the amount of sampled data used for gradient and CG calculations.

Sampling the amount of data used for gradient and CG calculations can be performed by observing the variance of the batch gradient to determine the amount of data to use for gradient and CG calculations. Alternatively, the amount of data used can be geometrically increased using a fixed schedule and avoiding the need to compute an expensive gradient variance. Embodiments of the present invention geometrically increase data for HF DNN training.

Experimental examples in connection with the embodiments of the present invention were conducted on a 50-hr English Broadcast News (BN) task, where preconditioning allowed for more than a 20% increase in the speed of HF training by reducing the number of CG iterations. Furthermore, gradient and CG sampling provided approximately an additional 20% improvement in training time. In total, combining both sampling and preconditioning processes resulted in an overall training time reduction by a factor of 1.5 for a 50-hr English Broadcast News (BN) task. In connection with a larger 300-hr Switchboard (SWB) task, combining both sampling and preconditioning processes resulted in an overall training time reduction by a factor of more than 2.3, with no loss in accuracy.

Hessian-Free Optimization

A brief summary of the HF algorithm for DNN training follows before detailing the increases in the training time speed made to the Hessian-free (HF) algorithm in connection with the embodiments of the present invention. It is to be understood that PCG can be substituted for CG in this description of the HF algorithm for DNN training.

Let $\theta$ denote the network parameters, $\mathcal{L}(\theta)$ denote a loss function, $\nabla \mathcal{L}(\theta)$ denote the gradient of the loss with respect to the parameters, d denote a search direction, and $B(\theta)$ denote a matrix characterizing the curvature of the loss around $\theta$ (i.e., a Hessian approximation). The central idea in HF optimization is to iteratively form a quadratic approximation to the loss, $$\mathcal{L}(\theta+d) \approx \mathcal{L}(\theta) + \nabla \mathcal{L}(\theta)^T d + \tfrac{1}{2} d^T B(\theta) d \qquad (1)$$

and to minimize this approximation using Krylov subspace methods, such as, for example, conjugated gradient (CG), which access the curvature matrix implicitly through matrix-vector products of the form $B(\theta)d$. Such products can be computed efficiently for neural networks. In the HF algorithm, the CG search is truncated, based upon the relative improvement in the approximate loss. The curvature matrix is often chosen to be the Gauss-Newton matrix $G(\theta)$, which may not be positive definite, but only positive semi-definite. To avoid breakdown of CG due to a singular curvature matrix, a positive definite approximation can be enforced by shifting the matrix using an additional damping term: $B(\theta)=G(\theta)+\lambda I$, where $\lambda$ is set via the Levenberg-Marquardt algorithm.

Referring to FIG. 1, the implementation of HF optimization, in accordance with an embodiment of the present invention, is illustrated as pseudo-code in Algorithm 1 (100). Gradients are computed over all the training data. Gauss-Newton matrix-vector products are computed over a sample (for example, about 1% of the training data) that is taken each time CG-Minimize is called. The loss, $\mathcal{L}(\theta)$, is computed over a held-out set. CG-Minimize($q_\theta(d), d_0$) uses CG to minimize $q_\theta(d)$, starting with search direction $d_0$. This function returns a series of steps $\{d_1, d_2, \ldots, d_N\}$ that are then used in a line search procedure. The parameter update, $\theta \leftarrow \theta + \alpha d_i$, is based on an Armijo rule backtracking line search. Distributed computation to computer gradients and curvature matrix-vector products is done using a master/worker architecture.

Preconditioning

A possible issue with this HF technique is that CG algorithms used to obtain an approximate solution to the Hessian require many iterations. FIG. 2 indicates that as HF training iterations increase, training time per iteration is dominated by CG iterations. FIG. 2 is a graph 200 plotting time (minutes) versus number of iterations. In accordance with an embodiment of the present invention, the number of CG iterations are reduced using preconditioning.

2nd-order optimization techniques require computation of the Hessian in order to determine a search direction of the form $d_k = -H_k^{-1} g_k$. In this formulation, $H_k$ is the Hessian approximation and $g_k$ the gradient of the objective function at the $k^{th}$ HF iteration. The aforementioned CG method can be used to solve for this search direction. Specifically, $H_k=(G_k+\lambda I)$ is set, where $G_k$ is the Gauss-Newton matrix, and $H_k d_k = -g_k$ is solved.

As mentioned above, in principle, L-BFGS can be used for optimization of the HF DNN training problem. One reason that L-BFGS was not used for optimization of neural networks is that, in practice, L-BFGS crudely approximates curvature of such systems, whereas, for this domain problem, HF algorithms manage to capture salient features of the curvature, and thereby identify search directions of extremely low curvature.

Yet, the computation of each HF search direction can be computationally excessive, requiring a great number of CG iterations. Thus, the use of quasi-Newton methods for preconditioning such implicit systems is proposed, as the structural assumptions of CG and L-BFGS are complementary. In accordance with a non-limiting embodiment of the present invention, the L-BFGS algorithm and detail using the L-BFGS algorithm as a preconditioner for flexible CG is described below.

L-BFGS Algorithm

L-BFGS is a non-limiting example of a quasi-Newton optimization method that uses a limited memory technique to approximate the Hessian or its inverse. In accordance with embodiments of the present invention, other quasi-Newton optimization methods, such as, for example, Davidon-Fletcher-Powell (DFP) and Symmetric rank one correction (SR1), may be used.

Instead of computing the Hessian directly, which can often be a large and dense matrix, the L-BFGS algorithm stores a small number of vectors, which can be used as a low rank approximation of the Hessian. Referring to FIG. 3, the L-BFGS algorithm is outlined in Algorithm 2 (300).

L-BFGS as a Preconditioner

CG iterative methods can be used to solve for the search direction $d_k$, by minimizing the following problem $H_k^{-1} g_k - d_k = 0$. Preconditioning typically involves a process or transformation (e.g., change of coordinates) applied upon a system of equations, which in return, converts the system to a more favorable structure. Preconditioning makes the CG problem easier to solve and reduces the number of CG iterations. If M is defined as a preconditioner, a preconditioned CG involves the following transformation to the CG problem $M^{-1}(H_k^{-1} g_k - d_k)$. The preconditioner M is required to be symmetric and positive definite, and fixed for all iterations. If any of these conditions are violated, the CG method may fail.

In connection with finding a suitable preconditioning scheme for a given problem, embodiments of the present invention take into account that each system has its own characteristic structure, and recognize that identification of which and respectively determining the type of preconditioner that works best can be problem specific. Embodiments of the present invention also take into account that if a preconditioner is computationally expensive to obtain, then this may offset any reduction in CG iterations, and thus the preconditioner will not be cost effective. Embodiments of the present invention further recognize that, as challenging as preconditioning is in ordinary circumstances, a greater challenge may be to precondition an implicit system that cannot be accessed directly.

Diagonal matrix preconditioners, which use diagonal elements of a Fisher information matrix as a preconditioner for HF training of DNNs, have been explored. Using diagonal matrix elements can have a very limited ability to precondition a system, and can be beneficial when a matrix suffers scaling issues. In addition, a Jacobi preconditioner, which is computed over a batch of data just like the curvature-vector products, thus requiring the master/worker data-parallelization architecture, has also been explored. In connection with a DNN speech problem, the Jacobi preconditioner may be costly to compute and offset reductions in CG iterations. The L-BFGS preconditioner in accordance with an embodiment of the present invention is more powerful compared to diagonal matrix preconditioners, as it improves the spectral properties of a system, rather than merely tackling potential scaling issues. Furthermore, the L-BFGS preconditioner does not require any data parallelization.

The L-BFGS preconditioner is described as follows. Each iteration i of CG and/or PCG, once a preconditioner has been applied, produces a sequence of iterates $x_i$ (i.e., $d_i$ in Algorithm 1) and a sequence of residuals $r_i$. Using these statistics, the vectors $s_i = x_{i+1} - x_i$ and $y_i = r_{i+1} - r_i$ are stored for m iterations of CG and/or PCG, where m is specified by the user. Once m statistics are saved, an L-BFGS matrix H can be defined using the steps in Algorithm 2. This L-BFGS matrix is used as the preconditioner for CG and for PCG as the preconditioner changes for different PCG iterations.

There are a variety of different methodologies to choose the m statistics to use when estimating the L-BFGS matrix. Embodiments of the present invention adopt a strategy using m vectors evenly distributed throughout the CG and/or PCG run, to estimate the L-BFGS matrix. This implies that the preconditioner, in accordance with an embodiment of the present invention, changes for different CG and/or PCG iterations. The requirement that the preconditioner needs to be fixed for all iterations of CG and/or PCG is inconvenient, since as more L-BFGS statistics are obtained, the estimate of the preconditioner can be improved. Embodiments of the present invention use a flexible Krylov subspace solver (e.g., flexible PCG) approach in response to changing the preconditioner for CG and/or PCG iterations. More specifically, according to an embodiment, instead of using the equivalent of Fletcher-Reeves updating formula for non-preconditioned CG and/or PCG, the Polak-Ribiére variant is used. This is opposed to previous approaches taken, which did not use a flexible CG or PCG approach.

Sampling

As noted above, instead of an HF technique using all data, and CG or PCG on a fixed data sample, embodiments of the present invention reduce the amount of data used for the gradient and CG computations. Specifically, embodiments of the present invention use a hybrid technique that first starts with a small amount of data similar to stochastic approximation methods, and gradually increases the amount of sampled data similar to sample approximation methods. Two different hybrid methods, in accordance with embodiments of the present invention, are detailed below.

Sampling from Variance Estimates

In accordance with an embodiment of the present invention, a method to increase the sample size based on variance estimates obtained during the computation of a batch gradient within a DNN framework is proposed. This algorithm can be described as follows. Denote $f(w;x_i)$ as the output from the DNN and $y_i$ the true output, such that a loss between predicted and true values can be defined as $l(f(w;x_i),y_i)$. The loss over the training set of size N, is defined as the sum of the losses from the individual training examples $x_i$ as shown by Equation 2.

$$J(\omega) = \frac{1}{N} \sum_{i=1}^{N} l(f(w; x_i)y_i) \quad (2)$$

In addition, the loss over a subset $S \subset \{1, \ldots, N\}$ is defined by Equation 3.

$$J_S(\omega) = \frac{1}{S} \sum_{i \in S} l(f(w; x_i), y_i) \quad (3)$$

Denoting the gradients of the full and subset losses as $\nabla J(w)$ and $\nabla J_S(w)$ respectively, the algorithm ensures that descent made in $J_S$ at every iteration must admit a descent direction for the true objective function J. The magnitude (2-norm) of the difference between the sample gradient and the actual gradient is expressed by Equation 4.

$$\delta_S(w) \equiv \|\nabla J_S(w) - \nabla J(w)\|_2 \leq \theta \|\nabla J_S(w)\|_2 \text{ where } \theta \in [0,1) \quad (4)$$

In practice, the quantity $\delta_S(w)$ is not evaluated (the computation of $\nabla J(w)$ is expensive for large data sets), but instead is estimated from the variance of $\nabla J_S(w)$. Inequality 4 can be simplified to the inequality.

$$\frac{\|\text{Var}_{i \in S}(\nabla l(w; i))\|_1}{|S|} \leq \theta^2 \|\nabla J_S(\omega)\|_2^2. \quad (5)$$

If this inequality fails, a new sample size $\hat{S} > S$ is selected to satisfy Inequality 5. The same dynamic selection strategy is also applied to the CG or PCG iterations.

Embodiments of the present invention use this sampling approach within a DNN framework. Given an input utterance u, the output of the DNN is the sum of the gradients of all training frames L in that utterance, i.e., $\Sigma_{i=1}^{L} \nabla l(w;i)$. Therefore, to compute the variance of the gradient estimate, this requires two passes through each utterance to compute the gradient and gradient-squared statistics $\Sigma_{i=1}^{L} \nabla l^2(w;i)$. Since this makes the algorithm computationally expensive, the average gradient per utterance u, i.e.

$$\bar{l}_u = \frac{1}{L} \sum_{i=1}^{L} \nabla l(w; i)$$

is computed. The variance statistics become the sum and sum-squared of $\bar{l}_u$ over all utterances $u \in S$ in the training set, as shown by Equation 6. This only requires one pass through the network per utterance.

$$\text{Var}_{i \in S}(\nabla l(w, i)) \approx \frac{\sum_{u=1}^{S} \bar{l}_u^2 - \left(\sum_{u=1}^{S} \bar{l}_u\right)^2 / S}{S - 1} \quad (6)$$

Geometric Sampling

The sampling approach set forth above uses sampling statistics to approximate the descent condition (5), but the need to estimate the variance in (5) adds computational complexity to the gradient computation. In contrast, another framework provides an expected guarantee of descent in each iteration, as long as the sampling errors $$E[\|\nabla J_S(w) - \nabla J(W)\|_2^2] \leq B_k$$

are bounded, and the bounds $B_k$ are decreasing. The sampling errors can be directly linked to the expected rate of convergence. This approach does not require computing statistics along the way, and the sampling strategy used to select S can be linked directly to the expected convergence rate.

A geometrically increasing sample size can be used, which is adopted, in an embodiment of the present invention, for the gradient and CG iteration samples in each iteration. Specifically, given an initial sample size $S_0$, the sample size at each iteration i is given by Equation 7 where $\alpha$ is the geometric factor that is tuned on a development set.

$$|S_i| = \alpha^i |S_0| \quad (7)$$

This approach fits has a practical benefit of a priori sample size selection. The sample size can be used both for gradient and CG iteration calculations.

Figure 4:
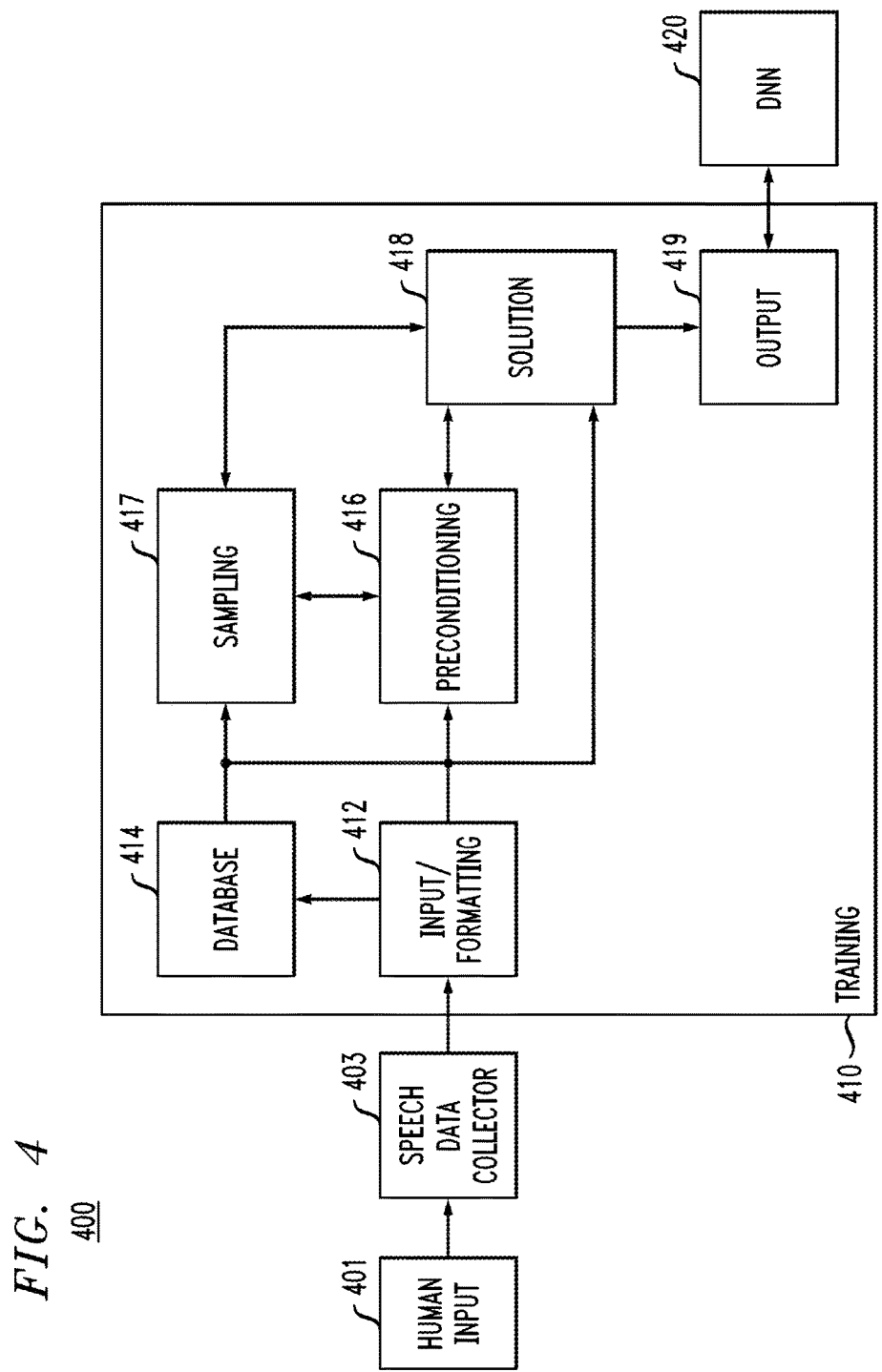
FIG. 4 is a flow diagram of a system for training a deep neural network, according to an exemplary embodiment of the invention.

FIG. 4 is a block diagram of a system for training a deep neural network, according to an exemplary embodiment of the present invention. As shown in FIG. 4 by lines and/or arrows, the components of the system 400 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

Referring to FIG. 4, human input 401 from, for example, Broadcast News (BN) and Switchboard (SWB) tasks, is inputted to a speech data collector 403. The human input 401 can also come from speakers communicating over a communication system, such as, for example, over the telephone. It is to be appreciated that a telephone system might be wireless or wired. Principles of the invention are not intended to be restricted to the type of speech data source, voice channel or communication system that is employed to receive/transmit speech signals to be used for training.

The speech data is collected through the speech data collector 403, which may be a storage repository for the speech being processed by the system 400. The speech data collector 403 sends the speech data to an input/formatting component 412 of a training component 410. In addition to the input/formatting component 412, the training component 410 includes database 414, preconditioning 416, sampling 417, solution 418 and output 419 components. Each of the components of the system 400 can be executed via one or more processors coupled to a memory.

The input/formatting component 412 receives the speech data from the speech data collector 403, and formats the speech data so that it is in an appropriate form for training by the training component 410. The formatted speech data can be stored in a database 414, which is accessible by preconditioning 416, sampling 417 and solution 418 components. The preconditioning 416, sampling 417 and solution 418 components can also access the formatted speech data from the input/formatting component 412 without going through the database 414.

The preconditioning component 416 preconditions a system of equations to be used for analyzing the speech data in connection with the training by using a non-fixed point quasi-Newton preconditioning scheme. The preconditioning scheme can comprise at least one of Limited Memory Broyden-Fletcher-Goldfarb-Shanno (L-BFGS), Davidon-Fletcher-Powell (DFP) and symmetric rank one correction (SR1). The solution component 418 employs flexible Krylov subspace solvers in response to variations in the preconditioning scheme for different iterations of the training. The Krylov subspace solvers may be any appropriate variant of the solvers family which is applicable to the underlying Hessian matrix structure, examples would be: a conjugated gradient (CG) solver, a preconditioned conjugated gradient (PCG) solver, a generalized minimal residual method (GMRES) solver, a minimal residual method (MINRES) solver, a biconjugate gradient stabilized method (BICG-STAB) solver and a quasi minimal residual (QMR) solver. In accordance with an embodiment of the present invention, the training is Hessian free (HF).

In accordance with an embodiment of the present invention, the preconditioning component 416 estimates a preconditioner matrix by using a plurality of vectors evenly distributed throughout an implementation of a Krylov subspace solver by the solution component 418.

The system further comprises a sampling component 417, which uses a sampling algorithm, which gradually increases an amount of the speech data in training batches utilized for gradient and Krylov subspace iteration calculations. According to an embodiment, the sampling component 417 also receives, from the solution component 418, variance estimates obtained during computation of a batch gradient within the deep neural network framework, and increases the amount of the speech data in the training batches based on the variance estimates.

According to an embodiment, the sampling component 417 increases the amount of the speech data in the training batches at each iteration by a geometric factor. A quantity of an increase of the amount of the speech data in the training batches can be linked to an expected convergence rate.

The training component 410 communicates with the deep neural network 420 via, for example, an output component 419, to obtain necessary network data needed for training the network 420, and to communicate results of the training to the network 420. While the network 420 is illustrated as a DNN, the embodiments of the present invention are not necessarily limited to use in connection with a DNN 420, and may be applicable to other types of networks.

Figure 5:
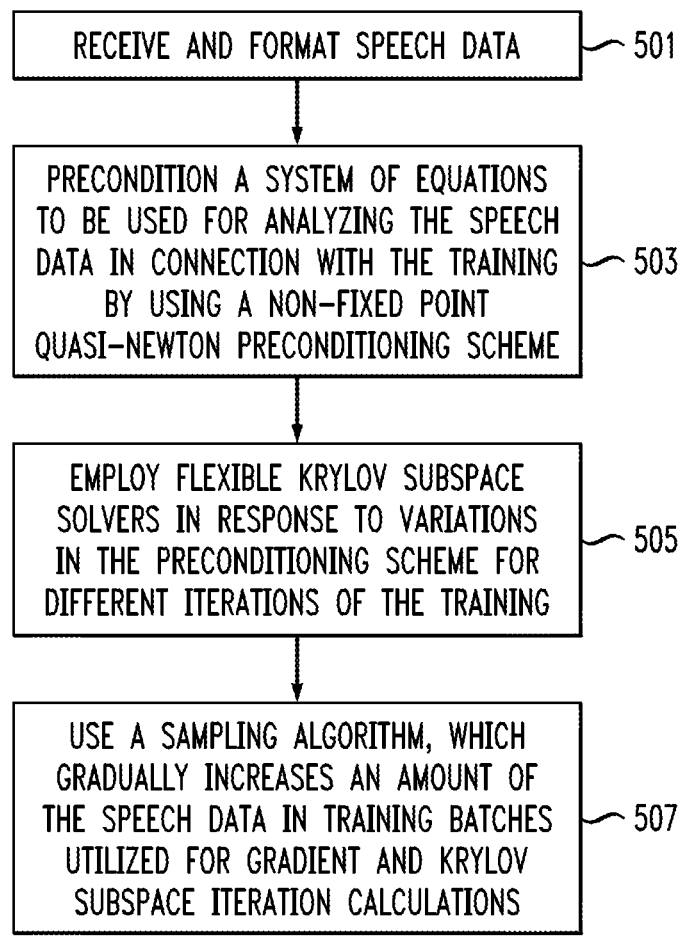
FIG. 5 is a block diagram of a process for training a deep neural network, according to an exemplary embodiment of the present invention.

FIG. 5 is a flow diagram of a process for training a deep neural network, according to an exemplary embodiment of the invention. Referring to FIG. 5, the process 500 includes, at block 501, receiving and formatting speech data for the training, at block 503, preconditioning a system of equations to be used for analyzing the speech data in connection with the training by using a non-fixed point quasi-Newton preconditioning scheme, and, at block 505, employing flexible Krylov subspace solvers in response to variations in the preconditioning scheme for different iterations of the training. The method may further comprise using a sampling algorithm, which gradually increases an amount of the speech data in training batches utilized for gradient and Krylov subspace iteration calculations (block 507). According to an embodiment, increasing the amount of the speech data in the training batches can be based on variance estimates obtained during computation of a batch gradient within the deep neural network framework. According to an embodiment, the amount of the speech data in the training batches can also be increased at each iteration by a geometric factor. A quantity of an increase of the amount of the speech data in the training batches can be linked to an expected convergence rate.

The preconditioning may comprise estimating the action of a preconditioner matrix or a preconditioning process upon a given vector or vectors.

EXPERIMENTS

Experiments were conducted on a 50-hr English Broadcast News (BN) task and results reported on both the EARS dev04f set. A recipe, outlined in H. Soltau, G. Saon, and B. Kingsbury, "*The IBM Attila speech recognition toolkit*," in Proc. IEEE Workshop on Spoken Language Technology, 2010, pp. 97-102, was used to extract acoustic features. The hybrid DNN was trained using speaker-adapted VTLN+ fMLLR features as input, with a context of 9 frames around the current frame. It was observed that a 5-layer DNN with 1,024 hidden units per layer and a sixth softmax layer with 2,220 output targets was an appropriate architecture for BN tasks.

The behavior of preconditioning and sampling was explored for HF training on a smaller BN task first, before moving to a larger Switchboard task. All timing experiments in this study were run on an 8 core Intel Xeon X5570@2.93 GHz CPU. Matrix/vector operations for DNN training were multi-threaded using Intel MKL-BLAS. 12 machines were exclusively reserved for HF training to get reliable training time estimates.

Experimental Results
Preconditioning

CG with preconditioning and no preconditioning (noPC) were compared. For preconditioning, the behavior with different numbers of statistics used to estimate the L-BFGS preconditioned were explored, namely 16 (PC-16), 32 (PC-32) and 64 (PC-64).

Table 1, set forth below, shows the total time spent in CG (noPC) or PCG, and total number of training iterations, to achieve the same loss.

TABLE 1

Total CG (noPC) or PCG runtime for
different quasi-Newton PC schemes

| Method | Loss   | HF Iterations | Time (min) |
|--------|--------|---------------|------------|
| noPC   | 1.9153 | 39            | 3,492.2    |
| PC-16  | 1.9157 | 35            | 3,042.2    |
| PC-32  | 1.9150 | 33            | 2,7095.3   |
| PC-64  | 1.9158 | 46            | 2,745.6    |

Figure 6:
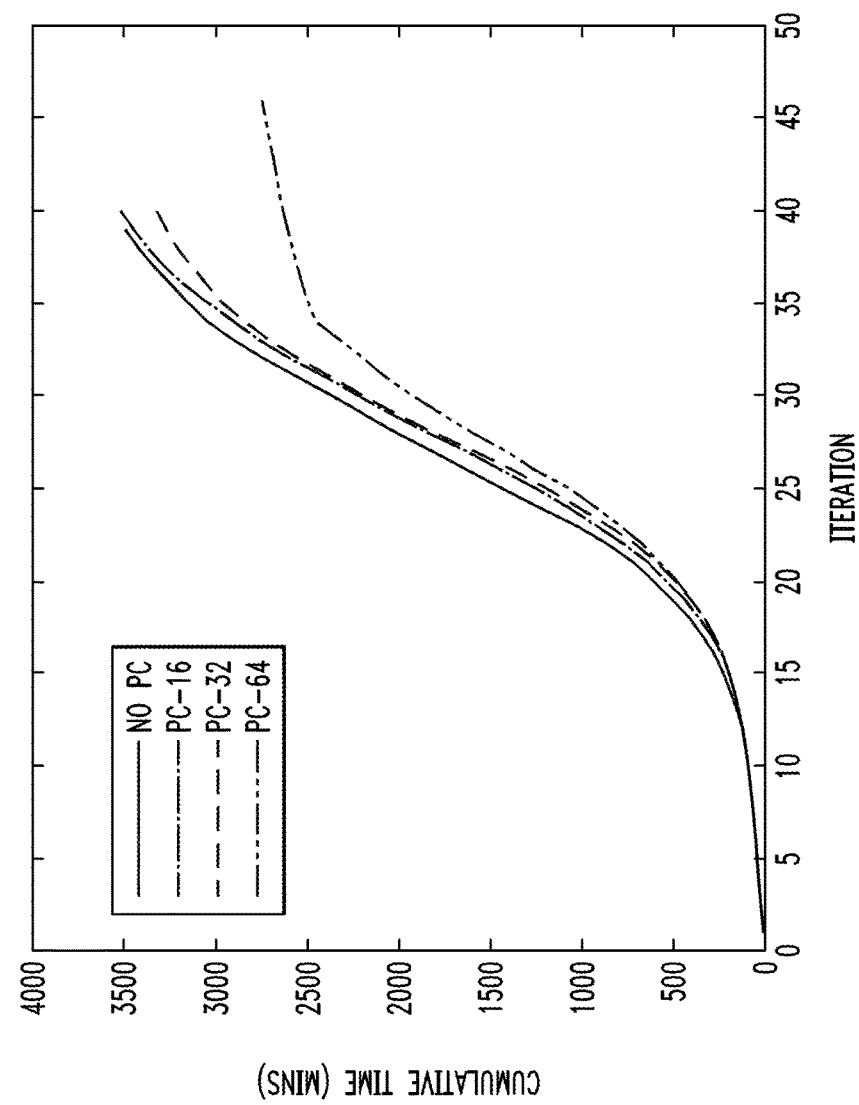
FIG. 6 is a graph plotting cumulative CG and PCG runtime for preconditioning methods versus number of iterations, according to an exemplary embodiment of the invention.

In addition, FIG. 6 provides a graph 600 of the cumulative CG or PCG runtime for the four methods outlined in Table 1. The graph 600 plots cumulative time (minutes) versus number of iterations. FIG. 6 indicates that all preconditioning methods require less time for PCG, particularly as the number of total HF iterations increases (and thus the number of PCG iterations increases). Referring to FIG. 6, PC-64 manifests a significant reduction in PCG time after 30 HF iterations, but this also results in the loss moving much slower for this method, as explained by increased HF iterations in Table 1. PC-32 appears to be the most cost-efficient choice for the given task, both in terms of PCG iteration runtime and in terms of loss reduction, and is roughly 22% faster than the baseline method.

Gradient+CG Sampling

Next, the behavior of the geometric and variance sampling methods were compared. Sampling methods require a tradeoff between amount of data used, and the number of iterations for the training loss to converge. Using too little data for gradient and CG will require more training iterations, while using too much data will make each iteration computationally expensive.

For geometric sampling, the geometric factor α was tuned on a held-out set for both gradient and CG. It was found that an $\alpha_g=1.2$ for the gradient, and $\alpha_{cg}=1.3$ for CG, allowed for the best tradeoff between reduction in amount of training data used and training time. This geometric factor corresponds to seeing roughly 100% of the total data used for gradient and CG calculations, when roughly 50% of the total training iterations are completed. For variance sampling, θ in Equation 6 is tuned, where a smaller θ favors a larger sample size.

Figure 7:
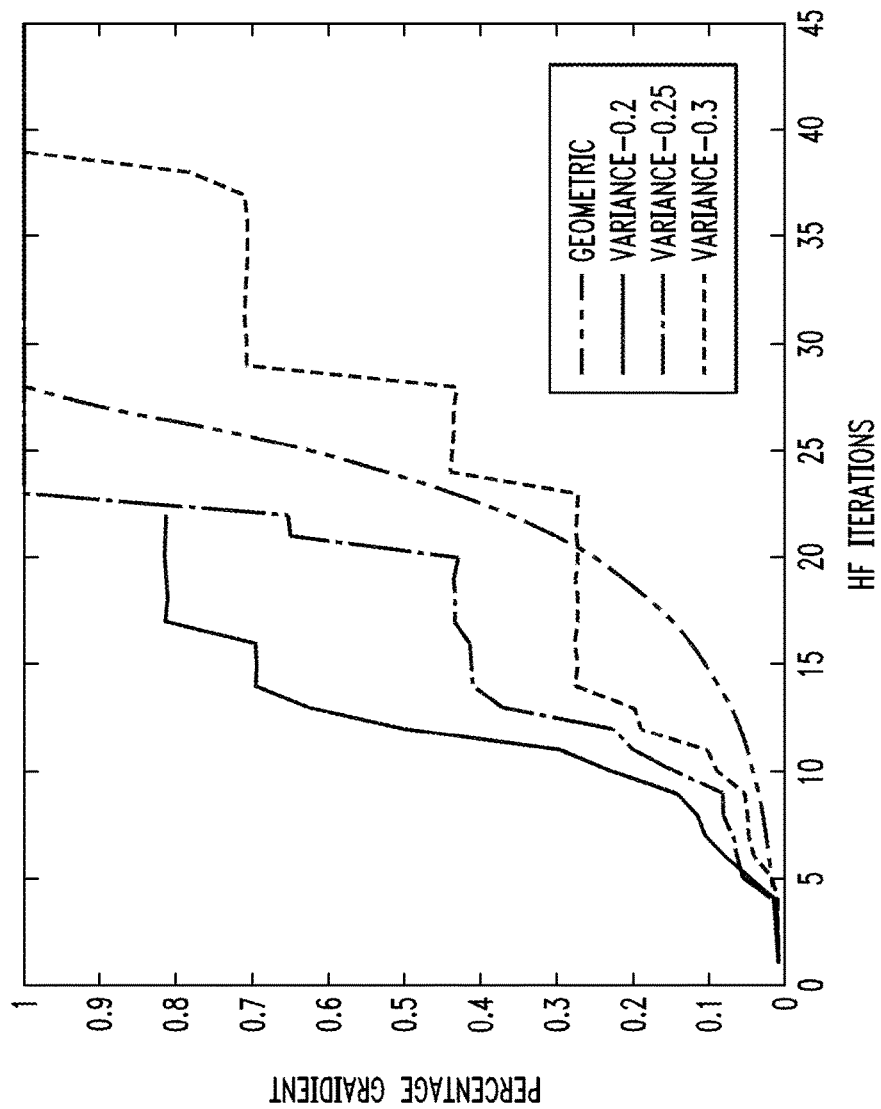
FIG. 7 is a graph plotting percentage gradient versus number of iterations to show the percentage of data accessed for a gradient for geometric and variance methods, for different values of θ, according to an exemplary embodiment of the present invention.

FIG. 7 is a graph 700 showing the percentage of data accessed for the gradient for the geometric and variance methods, per HF iteration, for three different values of θ. FIG. 7 plots percentage gradient versus number of iterations. Referring to FIG. 7, the variance methods access more training data at the beginning of training relative to the geometric method. One reason for this is that during the beginning of training, there is little data available to get a reliable variance estimate, so a larger sample size is preferred. The variance method with θ=0.25 provided the best tradeoff between training time and data accessed. A similar θ was also used for estimating amount of data used for CG.

Figure 8:
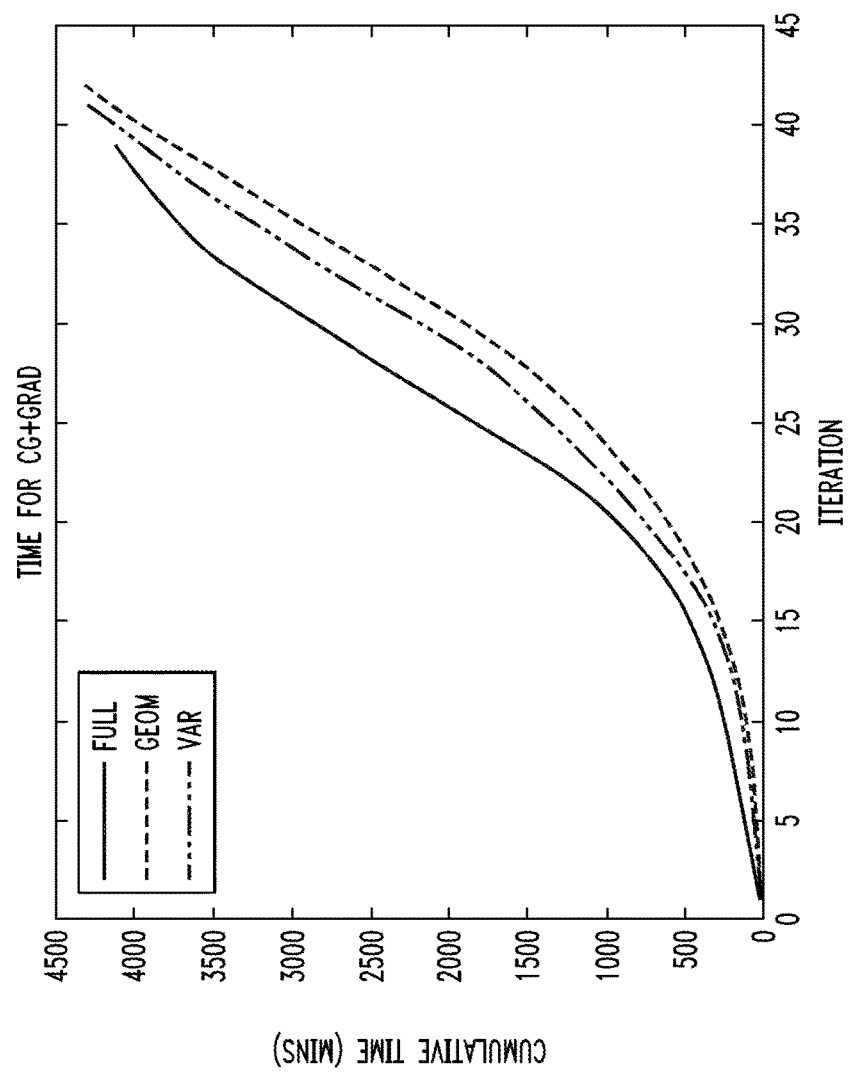
FIG. 8 is a graph plotting cumulative time (minutes) versus number of iterations to show the cumulative time for gradient and CG calculations per HF iteration, for full gradient/CG and sampling approaches, according to an exemplary embodiment of the present invention.

FIG. 8 is a graph 800 showing the cumulative time for gradient and CG calculation per HF iteration, for the full gradient/CG and sampling approaches, where both sampling approaches are tuned to provide the best tradeoff between training time and amount of data accessed. FIG. 8 plots cumulative time (minutes) versus number of iterations. Referring to FIG. 8, the geometric method is quicker than the variance sampling method, particularly because it accesses less data during early training iterations, as shown in FIG. 7. Overall, the geometric method was found to provide about a 20% reduction in training time. A technique that starts with geometric sampling, and then switches to variance sampling once enough data is obtained for a reliable variance estimate, may provide further reductions in training time.

Overall Reductions in Training Time

Figure 9:
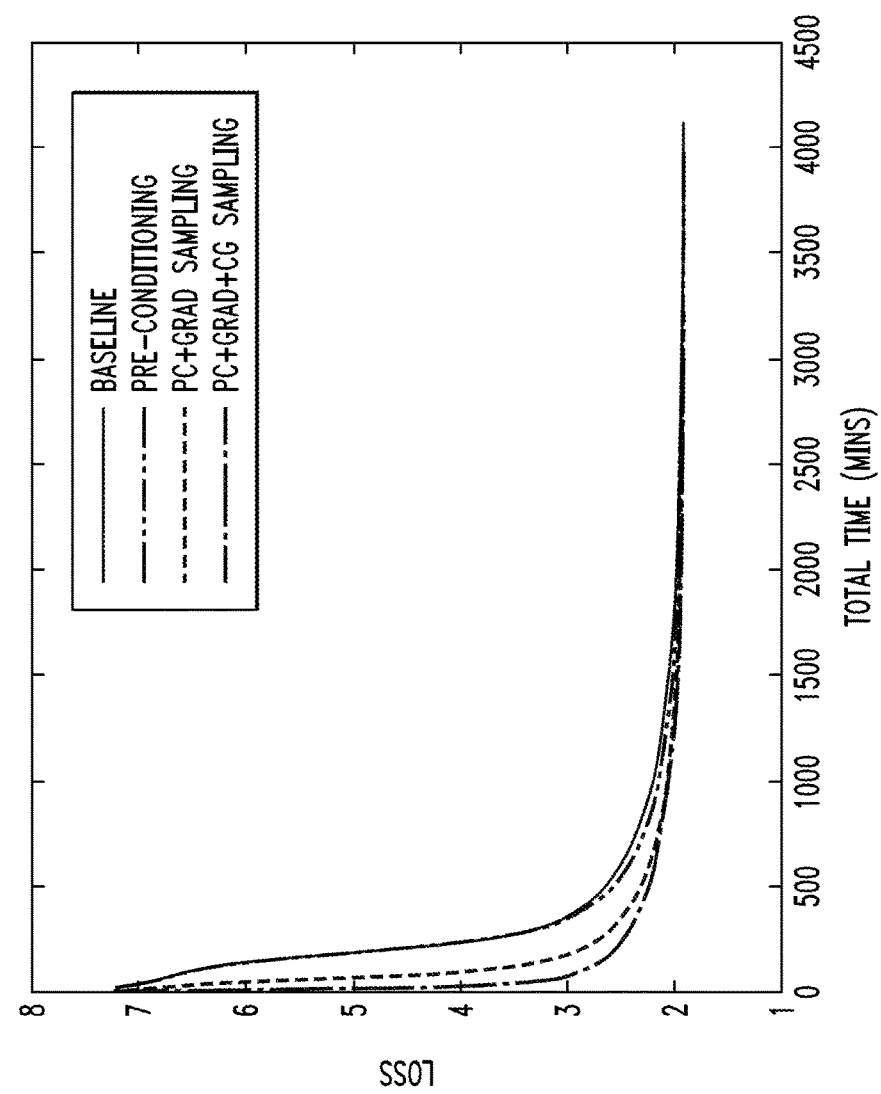
FIG. 9 is a graph plotting loss versus total training time (minutes) to show a trade-off between loss and overall training time of a baseline method, and methods according to exemplary embodiments of the present invention.

Preconditioning and sampling were combined to calculate an overall increase in speed of training time for BN. FIG. 9 is a graph 900 showing a trade-off between loss and overall training time of a baseline method, and methods according to embodiments of the present invention, including just preconditioning, preconditioning and gradient sampling, and preconditioning and gradient and CG sampling. FIG. 9 plots loss versus total training time (minutes). Referring to FIG. 9, PC+Gradient+CG sampling offers the fastest training time when compared to the baseline. Table 2 set forth below shows the training time and corresponding WER for the baseline and methods in accordance with embodiments of the present invention. Training time is reduced from 68.7 hours to 44.5 hours, roughly a 1.5× reduction in training time, with no loss in accuracy.

TABLE 2

Overall Training Time Improvements, Broadcast News

| Method              | WER  | Total Training Time (hrs) |
|---------------------|------|---------------------------|
| Baseline            | 17.8 | 68.7                      |
| PC + Grad + CG Speedups | 17.8 | 44.5                  |

Training Time Improvements on Larger Task

Training speed improvements were also explored on a larger 300-hour Switchboard task. DNNs performance on 300 hours of conversational American English telephony data from the Switchboard corpus was explored. Development was done on the Hub 5' 00 set, while testing was done on the rt03 set, where performance was reported separately on the Switchboard (SWB) and Fisher (FSH) portions of the set.

Similar to BN, the training features are speaker-adapted, using vocal tract length normalization (VTLN) and feature-space maximum likelihood linear regression (fMLLR) techniques. The input features into the DNN had an 11-frame context (±5) around the current frame. The DNN had six hidden layers each containing 2,048 sigmoidal units, and 8,260 output targets. Results with and without HF speedups are reported after sequence training.

Performance with the baseline and speedup HF techniques, in accordance with embodiments of the present invention, are shown in Table 3 set forth below.

TABLE 3

Overall Training Time Improvements, Switchboard

| Method              | WER  | Total Accessed Data Points |
|---------------------|------|----------------------------|
| Baseline            | 12.5 | 2.26e9                     |
| PC + Grad + CG Speedups | 12.5 | 9.95e8                 |

Since using 32 L-BFGS stats performed well for the smaller 50-hour BN task, the same was used on the Switchboard task for preconditioning. In addition, because of the increased amount of training data associated with the larger task, using a smaller sample size (i.e., α) for the gradient and CG iteration calculations still allowed for an appropriate estimate of these statistics.

More parallel machines (e.g., 64) were used for SWB compared to BN. As a result, it was not possible to exclusively reserve machines for timing calculations. Therefore, training time is estimated by calculating a total number of accessed data points for training, which is correlated to timing. Table 3 shows the total accessed data points for the baseline and speedup techniques. Notice that with a larger dataset, because it is possible to decrease the fraction of data used for gradient and conjugated gradient calculations, a larger reduction in training time (e.g., 2.3× over the baseline) relative to the smaller dataset can be achieved, with no loss in accuracy. This suggests that even further training time improvements are possible as the data size grows.

Embodiments of the present invention use a quasi-Newton (such as, for example, an L-BFGS algorithm) based preconditioner, and a geometric sampling approach to accelerate HF training. Both approaches combined can provide roughly a 1.5× speedup over a 50-hr Broadcast News task and a 2.3× speedup on a 300-hr Switchboard task, with no loss in accuracy. We anticipate an even larger speedup to be attained by more informed selection of quasi-Newton statistics (potentially adaptive), as well as by application of the proposed algorithmic strategies upon problems of greater scale.

In accordance with an embodiment of the present invention, computer processor based fast training of a DNN without significant accuracy degradation may comprise the steps of a) pre-training initial weights to make initial weights closer to optimal weights, b) selecting an initial batch of training data having an initial batch size for training, c) performing training on the initial batch of training data in parallel fashion, d) increasing sample size for a subsequent batch of training data, e) performing training on the subsequent batch of training data, and f) iteratively repeating steps d and e until all training data has been processed, Pre-training may be done by applying at least one of generative, unsupervised, discriminative, hybrid, and greedy training approaches. Optimal weights may comprise at least one weight closely linked to a final objective function. Training may comprise at least one of fine-tuning, backpropagation, etc. Batch size can be chosen by balancing between input/output, between computer processors and accuracy level.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
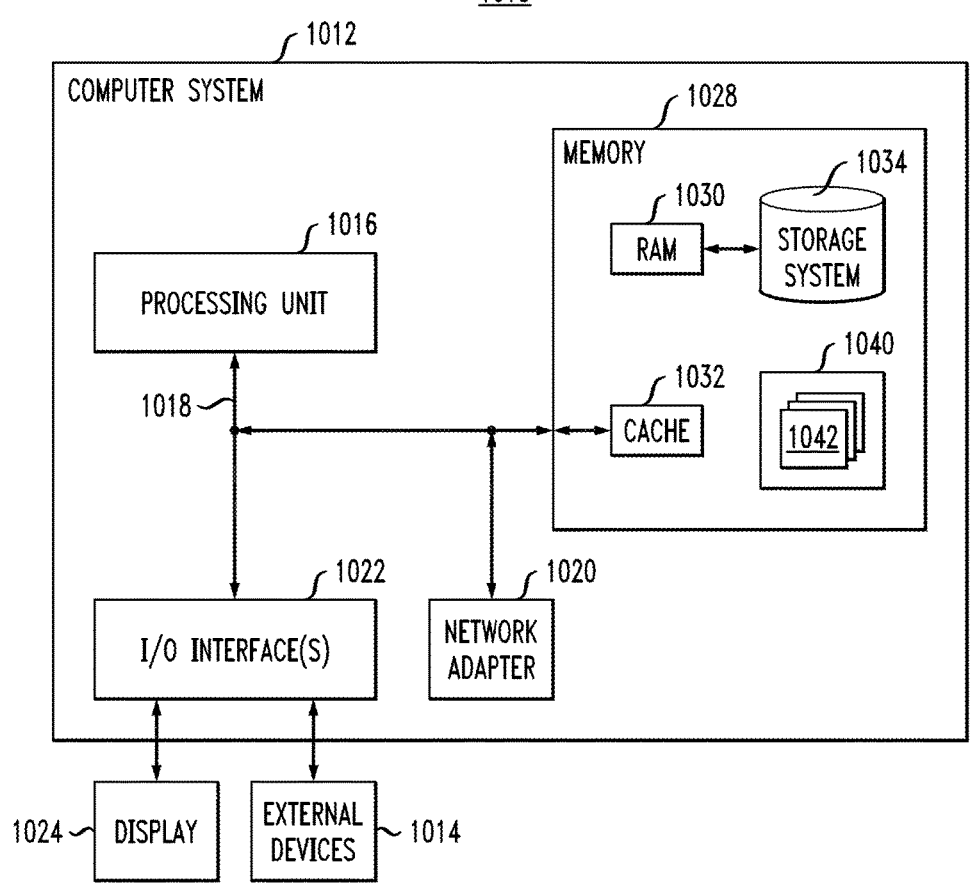
FIG. 10 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 10, in a computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

The bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1012 typically includes a variety of computer system readable media. Such media may be any available media that is accessible by computer system/server 1012, and it includes both volatile and non-volatile media, removable and non-removable media.

The system memory 1028 can include computer system readable media in the form of volatile memory, such as random access memory (RAM) 1030 and/or cache memory 1032. The computer system/server 1012 may further include other removable/non-removable, volatile/nonvolatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1018 by one or more data media interfaces. As depicted and described herein, the memory 1028 may include at least one program product having a set (e.g., at least one) of program modules that are configured to carry out the functions of embodiments of the invention. A program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc., one or more devices that enable a user to interact with computer system/server 1012, and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
    training a deep neural network, wherein the training comprises:
        receiving and formatting speech data for the training, wherein the speech data is received from a speech data collector;
        preconditioning a system of equations to be used for analyzing the formatted speech data in connection with the training by using a preconditioning scheme;
        generating at least one solution based on the preconditioned system of equations, wherein generating the at least one solution comprises employing subspace solvers in response to variations in the preconditioning scheme for different iterations of the training;
        using a sampling algorithm, which gradually increases an amount of the speech data in training batches utilized for gradient and subspace iteration calculations;
        obtaining variance estimates during computation of a batch gradient within a framework of the deep neural network;
        increasing the amount of the speech data in the training batches based on the variance estimates; and
        communicating the at least one solution to the deep neural network;
    wherein the steps are performed by a computer system comprising a memory and at least one processor coupled to the memory.

2. The method according to claim 1, wherein the preconditioning scheme comprises non-fixed point quasi-Newton preconditioning scheme.

3. The method according to claim 1, wherein the subspace solvers comprise flexible Krylov subspace solvers.

4. The method according to claim 1, wherein the training is Hessian free (HF).

5. The method according to claim 1, wherein the preconditioning comprises estimating a preconditioner matrix.

6. The method according to claim 5, further comprising using a plurality of vectors evenly distributed throughout an implementation of a flexible subspace solver to estimate the preconditioner matrix.

7. The method according to claim 1, wherein the amount of the speech data in the training batches is increased at one or more iterations by a geometric factor.

8. The method of claim 7, wherein a quantity of an increase of the amount of the speech data in the training batches is linked to an expected convergence rate.

9. A system, comprising:
    a memory and at least one processor coupled to the memory;
    wherein the at least one processor is configured for:
        receiving and formatting speech data, wherein the speech data is received from a speech data collector;
        preconditioning a system of equations to be used for analyzing the speech data in connection with the training by using a preconditioning scheme;
        generating at least one solution based on the preconditioned system of equations, wherein the generation of the at least one solution comprises employment of subspace solvers in response to variations in the preconditioning scheme for different iterations of the training;
        using a sampling algorithm, which gradually increases an amount of the speech data in training batches utilized for gradient and subspace iteration calculations;
        obtaining variance estimates during computation of a batch gradient within a framework of the deep neural network;
        increasing the amount of the speech data in the training batches based on the variance estimates; and
        communicating the at least one solution to the deep neural network.

10. The system according to claim 9, wherein the preconditioning scheme comprises non-fixed point quasi-Newton preconditioning scheme.

11. The system according to claim 9, wherein the subspace solvers comprise flexible Krylov subspace solvers.

12. The system according to claim 9, wherein the training is Hessian free (HF).

13. The system according to claim 9, wherein the at least one processor is further configured for increasing the amount of the speech data in the training batches at one or more iterations by a geometric factor.

14. The system of claim 13, wherein a quantity of an increase of the amount of the speech data in the training batches is linked to an expected convergence rate.

15. The system according to claim 9, wherein the at least one processor is further configured for estimating a preconditioner matrix by using a plurality of vectors evenly distributed throughout an implementation of a flexible subspace solver.

16. A computer program product comprising a non-transitory computer readable storage medium having program instructions embodied therewith, the program instructions executable by a processor to cause the processor to perform a method comprising:
    training a deep neural network, wherein the training comprises:
        receiving and formatting speech data for the training, wherein the speech data is received from a speech data collector;
        preconditioning a system of equations to be used for analyzing the formatted speech data in connection with the training by using a preconditioning scheme;
        generating at least one solution based on the preconditioned system of equations, wherein generating the at least one solution comprises employing subspace solvers in response to variations in the preconditioning scheme for different iterations of the training;
        using a sampling algorithm, which gradually increases an amount of the speech data in training batches utilized for gradient and subspace iteration calculations;
        obtaining variance estimates during computation of a batch gradient within a framework of the deep neural network;
        increasing the amount of the speech data in the training batches based on the variance estimates; and
        communicating the at least one solution to the deep neural network.

* * * * *